June 13, 1961 N. LASAREV ET AL 2,988,257

CAPSTAN DRIVE ASSEMBLY

Filed Sept. 15, 1958

INVENTORS
NICK LASAREV
WALTER T. SELSTED

BY Flehr and Swain

ATTORNEYS 2,988,257
CAPSTAN DRIVE ASSEMBLY

Nick Lasarev, Palo Alto, and Walter T. Selsted, Redwood City, Calif., assignors to Ampex Corporation, Redwood City, Calif., a corporation of California Filed Sept. 15, 1958, Ser. No. 761,098
4 Claims. (Cl. 226—187)

This invention relates generally to machines making use of a record of the tape type (e.g. magnetic tape), and which are used for signal recording or playback.

Conventional magnetic tape machines employ a motor driven capstan for driving the tape past the magnetic head. The tape is clamped or pressed against the periphery of the capstan by an idler or pinch roller, which may be surfaced with resilient material (e.g. natural or synthetic rubber), and which is carried by a rigid swinging arm. The arm is attached to an operating shaft whereby a solenoid or like motive means serves to move the idler between tape release and tape clamping positions. While such an assembly is satisfactory for many machines, it may cause difficulties when employed with wide tapes, as, for example, tapes having a width of the order of 1½ inches or more. For example, when such a conventional assembly is used in a machine for recording video frequencies, where record tracks may be made in successive sweeps across a tape that is 2 inches in width, unequal pressures may be applied by the roller to the tape, with resulting unsatisfactory operating characteristics, such as unequal tape tension, slippage between the capstan and the tape, and edgewise shifting of the tape. Since such machines require utmost precision for satisfactory performance, it will be evident that conventional drive arrangements of the type described above are inadequate.

In general it is an object of the present invention to provide a capstan tape driving assembly which will overcome the above outlined difficulties with conventional assemblies.

Another object of the invention is to provide a tape driving assembly which will insure even pressure of the idler roller upon a wide tape.

Another object of the invention is to provide a capstan driving assembly of simple construction, which does not require frequent field adjustments to maintain proper operation.

Additional objects and features of the invention will appear from the following description in which the preferred embodiment has been set forth in detail in conjunction with the drawing.

Referring to the drawing.

Figure 1:
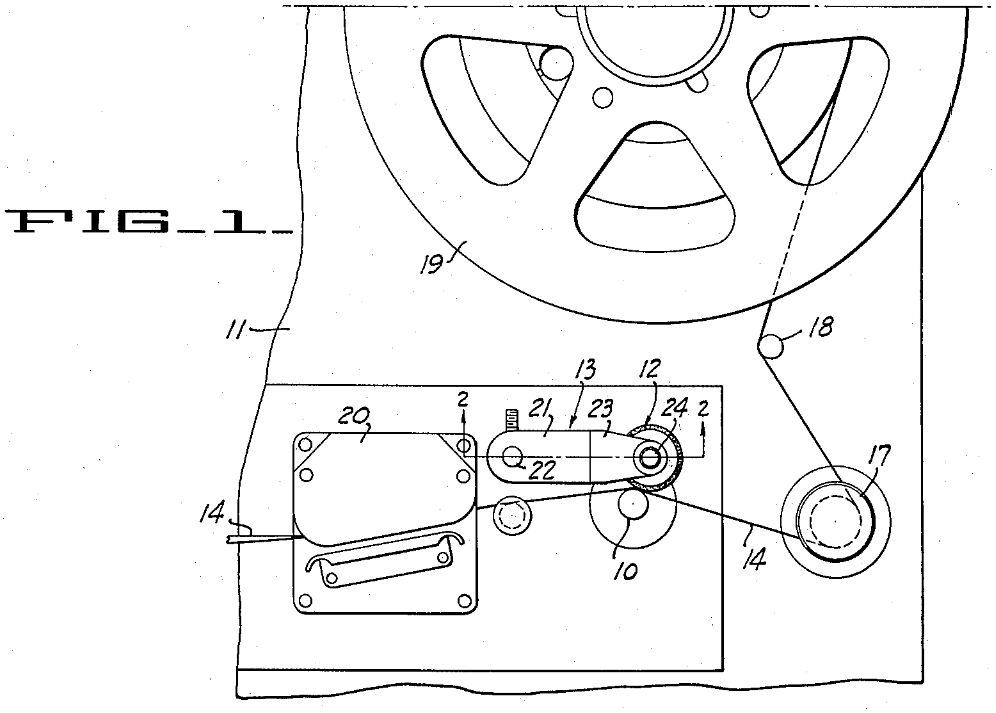
FIGURE 1 is a plan view schematically illustrating a capstan assembly in accordance with the present invention.
Figure 2:
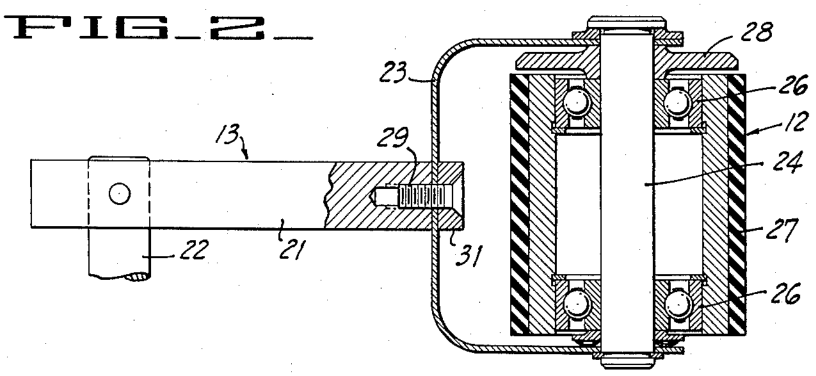
FIGURE 2 is a side elevational view, partly in section, showing the idler roller and its mounting means.
Figure 3:
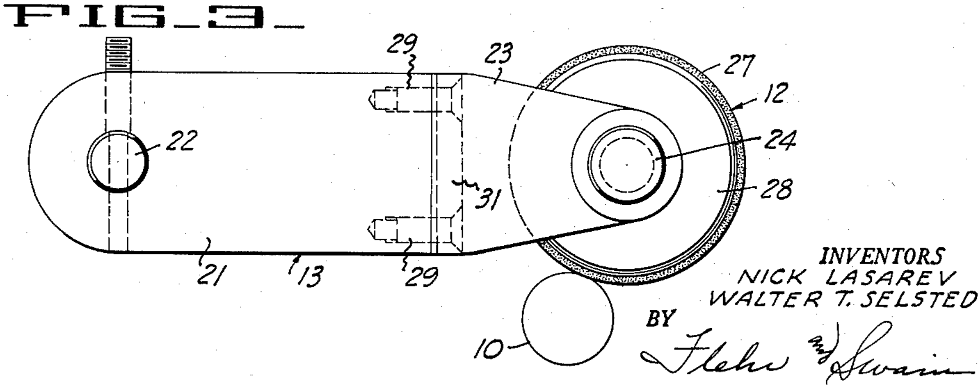
FIGURE 3 is a plan view of the roller and mounting means shown in FIGURE 2.

In FIGURE 1, I have shown a tape driving capstan 10 mounted upon the top panel 11 of a magnetic tape machine. This capstan has a cylindrical surface for frictionally engaging the tape, and is driven by suitable motor means (not shown). An idler or pinch roller 12 is disposed adjacent the capstan and is carried by the special means 13. The magnetic tape 14 is shown passing between the capstan and the roller 12, and from thence it may pass over the side roller 17 and stud 18, to the tape reel 19. It is assumed in this instance that the tape is of the order of 2 inches in width, and is being drawn across one or more transducer head assemblies (such as the head 20), before passing over the capstan 10.

The special mounting means 13 serves to carry the idler roller 12 for swinging movement between tape release and tape engaging positions. It consists of an arm member 21 formed of suitable rigid material, and fixed to the upper end of the operating shaft 22. This shaft extends through the top panel 11 of the machine, and is operatively connected to solenoid or other suitable motive means for turning the same between angular limits. The free end of member 21 is attached to the yoke member 23, which is formed of a metal ribbon or strip having a substantial amount of resilience or springiness. The upper and lower branches of the member 23 carry the ends of bearing pin 24, which in turn, together with the ball bearing assemblies 26, serve to rotatably carry the idler roller 12. As indicated, this roller may be provided with a surfacing 27 of suitable resilient material, such as natural or synthetic rubber. An annular guard member 28 may be carried by the upper end of the pin, and is shown extending over the upper end of the roller.

The member 23 is attached to the free end of member 21, the region of attachment being in a plane perpendicular to the axis of roller 12 and midway between the ends of the roller. The single attaching means shown employs screws 29 and the clamp bar 31. When the parts are factory assembled the connection between the members 21 and 23 is such that the axis of pin 24 is parallel to the shaft 22, or the bore in member 21 which accommodates this shaft.

Operation of the assembly described above is as follows: When the tape is not engaged by the roller 12, this roller is in a retracted position in which it is spaced from the capstan. When the tape is to be driven, the motive means connected to shaft 22 causes arm 21 to be swung to the position shown in FIGURE 1, whereby roller 12 is urged against the tape to press the tape into driving relation with the periphery of the capstan. The amount of this pressure can be determined by the amount of torque applied to the shaft 22. An adjustable stop may be provoided to limit the annular position of shaft 22, during tape driving operations. In any event, as torque is applied to shaft 22 to press the roller against the tape, there is a certain amount of give between the roller and the arm 21, such give is made possible by the resilient or springy nature of the yoke 23. In addition, there may be a slight amount of turning of the axis of pin 24, relative to the axis of the capstan, to accommodate for any small mechanical inaccuracies. The net result is to establish a uniform narrow area of contact between the tape and the periphery of the roller 12, with the pressure per unit area being uniform over the entire width of the tape. It may be explained at this point that the length of the roller may be somewhat greater than the width of the tape, whereby end margins of the roller which extend beyond the edges of the tape, may bear directly upon the capstan periphery.

Uniform pressure between the roller and the tape, as described above, provides optimum operating characteristics. Particularly it avoids slippage and uneven driving, or tendency of the tape to shift edgewise. In general my assembly will attain the desired degree of precision necessary in recording machines designed for wide frequency spectrums as, for example, machines for the recording or playback of television programs.

It will be evident from the foregoing that in operation my assembly is capable of accommodating for various inaccuracies, without interfering with the desired uniform pressure between the periphery of the idler roller and the tape. For example, if the pin 24 is not precisely parallel to the axis of the capstan, a small amount of compensating twist takes place between the axis of the pin and the rigid member 21. Because the point of connection of member 21 with the member 23 is midway between the ends of the roller, torque applied to shaft 22 tending to urge the roller against the capstan, applies equal forces to the upper and lower ends of the pin 24, whereby for various clamping torques which one may wish to establish, the forces are distributed to establish uniform contact pressure upon the tape.

We claim:

1. In apparatus of the character described, wherein a rotatable capstan having a cylindrical periphery is provided for driving tape for record or playback operations, an idler roller adapted to engage one side of the tape to press the same against the periphery of the capstan, an arm member, means serving to support the arm member for swinging movements in a plane at right angles to the axis of the capstan and about a pivot point spaced from said capstan in a direction opposite to the direction of tangential movement of opposed portions of said capstan and roller, resilient means serving to carry the idler roller upon the free end of said arm member, said last means permitting limited twisting of the roller shaft in either direction relative to said arm member and axial free pivoting translation of said roller about a point on said arm member, and permitting give of the idler roller when a predetermined torque is applied to said arm member to urge the roller against the tape and the capstan; and means for applying said predetermined torque to said arm member.

2. In apparatus of the character described wherein a rotatable capstan having a cylindrical periphery is provided for driving a tape for record or playback operations, an idler roller adapted to engage one side of the tape to press the same against the capstan and about a pivot point spaced from said capstan in a direction opposite to the direction of tangential movement of opposed portions of said capstan and roller, a rigid arm member, means serving to support said member for swinging movement of the same in a plane perpendicular to the axis of the capstan, a yoke member formed of spring strip metal having its side branches connected to the ends of the idler roller, a medial portion of said yoke member being connected to the swinging end of said arm member, said yoke member providing give to accommodate limited twisting of the idler roller relative to the capstan roller, and axial pivoting translation of said roller to equally distribute predetermined forces applied to said arm member to provide even contact pressure between the periphery of the idler roller and the tape; and means for applying said predetermined forces to said arm member.

3. Apparatus for aligning a pinch roller with a capstan that is driven to rotate in a predetermined direction, comprising: means mounting said pinch roller for at least forced peripheral engagement of the mid-portion thereof with said capstan and for at least forced axial swinging motion about a pivot point spaced from the engaged portions of said roller and capstan in a direction opposite to the direction of tangential motion of said portions, said means responding to provide said swinging motion upon application of a predetermined maximum force in a direction axially parallel to said roller; and means coupled to said mounting means for urging said mid-point of said roller into pressurized frictional engagement with said capstan so as to provide said predetermined force as a resultant of said pressurized engagement and of the driving action of said capstan, whereby said roller is automatically driven to and is maintained in a position of full axial parallelism with said capstan.

4. Apparatus for aligning a pinch roller and a capstan having a predetermined direction of rotation, comprising: an arm having said roller transversely and axially rotatably mounted on one end, said arm including a mounting portion and being mounted thereby for selective operation to urge said roller into peripheral engagement with said capstan with the axis of said roller approximately parallel to the axis of said capstan and with said arm extending said roller in the direction of tangential motion of the engaged portions of said roller and capstan, said roller being mounted on said arm for at least forced twisting motion of said roller in a plane perpendicular to the length of said arm and at least forced axial swinging motion of said roller in the plane defined by said arm and roller and about a pivot point on said arm, with said arm responding to provide said at least forced motions upon application thereto of a predetermined force tending to pivot said arm and roller into said peripheral engagement with said capstan; and means for applying said predetermined force to said arm, whereby said roller is urged by said arm and driven by said capstan to a position of exact parallelism with said capstan.

References Cited in the file of this patent

UNITED STATES PATENTS

| | | |
|---|---|---|
| 667,436 | Granichstaedten | Feb. 5, 1901 |
| 1,981,229 | Gillet | Nov. 20, 1934 |
| 2,092,158 | Hasbrouck | Sept. 7, 1937 |
| 2,102,895 | Hasbrouck | Dec. 21, 1937 |
| 2,369,207 | Boecking | Feb. 13, 1945 |
| 2,721,076 | Baker | Oct. 18, 1955 |
| 2,721,650 | Cummings | Oct. 25, 1955 |
| 2,788,209 | Montijo | Apr. 9, 1957 |
| 2,830,810 | Colburn | Apr. 15, 1958 |
| 2,858,130 | Baur et al. | Oct. 28, 1958 |

UNITED STATES PATENT OFFICE
CERTIFICATE OF CORRECTION

Patent No. 2,988,257 June 13, 1961

Nick Lasarev et al.

It is hereby certified that error appears in the above numbered patent requiring correction and that the said Letters Patent should read as corrected below.

Column 3, lines 31 to 34, strike out "and about a pivot point spaced from said capstan in a direction opposite to the direction of tangential movement of opposed portions of said capstan and roller" and insert the same after "capstan" and before the comma, in line 37, same column 3.

Signed and sealed this 7th day of November 1961.

(SEAL)
Attest:

ERNEST W. SWIDER
Attesting Officer

DAVID L. LADD
Commissioner of Patents

USCOMM-DC